US010331436B2

(12) United States Patent
Deshpande et al.

(10) Patent No.: US 10,331,436 B2
(45) Date of Patent: Jun. 25, 2019

(54) SMART REVIEWS FOR APPLICATIONS IN APPLICATION STORES

(71) Applicant: International Business Machines Corporation, Armonk, NY (US)

(72) Inventors: Pralhad D. Deshpande, Bangalore (IN); Vijay Ekambaram, Chennai (IN); Ashish K. Mathur, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 15/464,203

(22) Filed: Mar. 20, 2017

(65) Prior Publication Data

US 2018/0267795 A1      Sep. 20, 2018

(51) Int. Cl.
  *G06F 8/70*                (2018.01)
(52) U.S. Cl.
  CPC ...................... *G06F 8/70* (2013.01)
(58) Field of Classification Search
  CPC ....................................................... G06F 8/70
  See application file for complete search history.

(56) References Cited

U.S. PATENT DOCUMENTS

| 8,108,255 | B1 | 1/2012 | Robinson et al. |
| 8,380,694 | B2 | 2/2013 | Ruhl et al. |
| 8,578,501 | B1 | 11/2013 | Ogilvie |
| 9,582,264 | B1 | 2/2017 | Anbil Parthipan et al. |
| 2009/0299824 | A1* | 12/2009 | Barnes, Jr. .......... G06F 3/04847 705/7.39 |
| 2011/0173191 | A1 | 7/2011 | Tsaparas et al. |
| 2013/0066800 | A1 | 3/2013 | Falcone et al. |
| 2013/0144802 | A1 | 6/2013 | Bank et al. |
| 2013/0173491 | A1 | 7/2013 | Nations et al. |
| 2013/0231989 | A1 | 9/2013 | Abu Ayyash |
| 2013/0275554 | A1 | 10/2013 | Smith |
| 2014/0173561 | A1 | 6/2014 | Toub |
| 2014/0230053 | A1 | 8/2014 | Mote et al. |
| 2016/0156978 | A9 | 6/2016 | Aaron et al. |
| 2017/0046246 | A1* | 2/2017 | Kaulgud ............. G06F 11/3612 |

OTHER PUBLICATIONS

Krings, M. "Researchers developing algorithms to detect fake reviews", Oct. 21, 2014, 3 pages <https://phys.org/news/2014-10-algorithms-fake.html>.

(Continued)

*Primary Examiner* — Wei Y Zhen
*Assistant Examiner* — Amir Soltanzadeh
(74) *Attorney, Agent, or Firm* — Patterson + Sheridan, LLP

(57) ABSTRACT

Systems, methods, and computer program products to perform an operation comprising receiving, via an interface, a first review specifying a first rating value, a second rating value, and a textual review for an application in an application store, associating the first review in the application store with the first rating value, invoking a semantics analysis engine to determine that the textual review specifies a first known performance issue for the application, determining, based on an update to the application and reviews for the application received subsequent to the update to the application, that the first known performance issue has been resolved, and associating the first review in the application store with the second rating value.

20 Claims, 7 Drawing Sheets

(56) References Cited

OTHER PUBLICATIONS

Desta, Y. "How to Spot a Fake Online Review", May 29, 2014, 3 pages <http://mashable.com/2014/05/29/fake-online-reviews-tips/#sCpGFEcc7sqB>.
Moghaddam S. (2015) Beyond Sentiment Analysis: Mining Defects and Improvements from Customer Feedback. In: Hanbury A., Kazai G., Rauber A., Fuhr N. (eds) Advances in Information Retrieval. ECIR 2015. Lecture Notes in Computer Science, vol. 9022. Springer, Cham (abstract only) <http://link.springer.com/chapter/10.1007/978-3-319-16354-3_44#>.

* cited by examiner

US 10,331,436 B2

SMART REVIEWS FOR APPLICATIONS IN APPLICATION STORES

BACKGROUND

The present invention relates to computer software, and more specifically, to computer software which provides smart reviews for applications in application stores.

Application stores provide a centralized location for developers to host applications that can be downloaded by users for installation on various devices executing common operating systems. In addition, users can submit reviews of the applications hosted in the application store. Often, these reviews highly influence whether a given application is successful or not. Furthermore, application developers often read user reviews to identify defects or other issues in their applications. Doing so allows developers to update the applications accordingly in an attempt to please users.

SUMMARY

In one embodiment, a method comprises receiving, via an interface, a first review specifying a first rating value, a second rating value, and a textual review for an application in an application store, associating the first review in the application store with the first rating value, invoking a semantics analysis engine to determine that the textual review specifies a first known performance issue for the application, determining, based on an update to the application and reviews for the application received subsequent to the update to the application, that the first known performance issue has been resolved, and associating the first review in the application store with the second rating value.

In another embodiment, a system comprises a processor and a memory storing instructions, which when executed by the processor, performs an operation comprising receiving, via an interface, a first review specifying a first rating value, a second rating value, and a textual review for an application in an application store, associating the first review in the application store with the first rating value, invoking a semantics analysis engine to determine that the textual review specifies a first known performance issue for the application, determining, based on an update to the application and reviews for the application received subsequent to the update to the application, that the first known performance issue has been resolved, and associating the first review in the application store with the second rating value.

In another embodiment, a computer-readable storage medium has computer-readable program code embodied therewith, the computer-readable program code executable by a processor to perform an operation comprising receiving, via an interface, a first review specifying a first rating value, a second rating value, and a textual review for an application in an application store, associating the first review in the application store with the first rating value, invoking a semantics analysis engine to determine that the textual review specifies a first known performance issue for the application, determining, based on an update to the application and reviews for the application received subsequent to the update to the application, that the first known performance issue has been resolved, and associating the first review in the application store with the second rating value.

DETAILED DESCRIPTION

Embodiments disclosed herein provide a smart review tool for applications in application stores. Generally the smart review tool is an automated review updating system which allows users to provide alternate reviews for applications that are associated with a bug, functional defect, error, usability issue, or other problem associated with an application (collectively referred to herein as application "performance issues"). If the performance issue is fixed by the application developer, the smart review tool will update the user's initial review with the alternate review. For example, a user may give an application an initial review specifying 1 out of 5 stars because the application has a memory management bug. However, the user may specify an alternate, or "smart" review of 4 out of 5 stars if a memory management flaw of the application is fixed. The smart review tool then monitors updates to the application and subsequent user reviews to determine that the memory management flaw has been fixed. The smart review tool may then automatically update the user's review by replacing the initial review of 1 out of 5 stars with the smart review of 4 out of 5 stars.

Additionally, the smart review tool may leverage a monetary fund to incentivize users to participate in the smart review program. For example, the smart review tool may programmatically identify the most helpful reviews (based on user and/or developer feedback), and provide rewards to the associated users. Furthermore, application developers may integrate smart reviews in application development and lifecycle platforms, providing application developers with an automated, real-time indication of the most important performance issues affecting their applications.

Figure 1A:
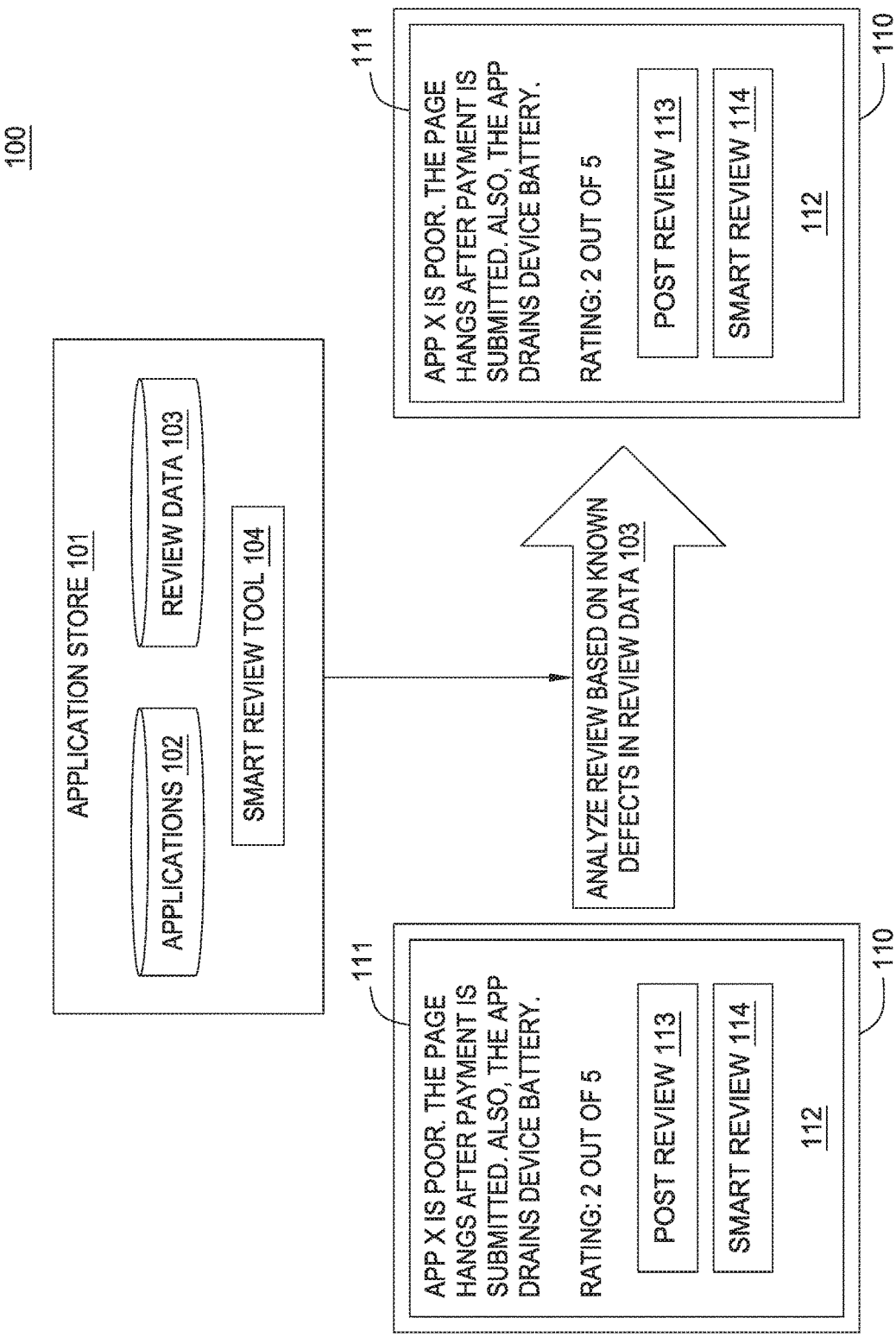
FIGS. 1A-1B illustrate an example system architecture to provide smart reviews for applications in application stores, according to one embodiment.

FIG. 1A illustrates an example system architecture 100 to provide smart reviews for applications in application stores, according to one embodiment. As shown, the system 100 includes an application store 101 and a computing device 110. The application store 101 is a digital distribution platform that allows developers to provide applications 102 that can be installed on user devices, such as the computing device 110. Examples of the application store 101 include, without limitation, the Worklight Application Center by IBM, the App Store® by Apple Inc., and the Google Play® Store, by Google, Inc. The computing device 110 is representative of any type of computing device, such as a desktop computer, server, mobile computing device, smartphone, laptop, tablet computer, portable gaming console, and the like. As shown, the application store 101 further includes the review data 103 and smart review tool 104. The review data 103 is configured to store user-submitted reviews of the applications 102. The smart review tool 104 is and automated system which allows users to provide smart reviews for the applications 102 that are stored in the review data 103.

For example, as shown, a user interacts with a graphical user interface (GUI) 112 outputted on a display 111 of the device 110 to compose a review for an example application 102, App X. Specifically, the user provides a rating of 2 out of 5 stars, and states that App X "hangs after payment is submitted" and "drains device battery." As shown, the GUI 112 includes two options for submitting the review, namely a "post review" button 113 and a "smart review" button 114. The post review button 113 allows the user to submit a conventional review, which is stored in the review data 103. However, the smart review button 114 allows the user to participate in the smart review program, which is maintained by the smart review tool 104. When the user clicks the smart review button 114 (or performs a predefined operation, such as shaking a mobile device 110), the smart review tool 104 analyzes the review based on known performance issues of the App X. Generally, the smart review tool 104 continuously analyzes the text of user reviews stored in the review data 103 to identify defects of a given application 102, and store an indication of the identified defects in the review data 103. Doing so allows the smart review tool 104 to solve the challenge of identifying specific concerns from the noisy text provided in user reviews in an effective way to enable the smart review program.

For example, based on an analysis of the review data 103, the smart review tool 104 may determine that the page hang and battery drain of App X are known defects of the application. The smart review tool 104 may store an indication of each defect in the review data 103, which includes a textual description of the defect, a number of users who have commented about the defect, and a level of criticality of each defect. As such, the smart review tool 104 may perform a semantic comparison between the text (and/or concepts therein) of the smart review provided in the GUI 112 to determine that the page hang and battery drain are known defects of App X. In response, the smart review tool 104 updates the GUI 112 to highlight each defect. As shown, for example, the smart review tool 104 has updated the GUI 112 to italicize "hangs after payment is submitted" and "drains device battery" in the GUI 112.

Figure 1B:
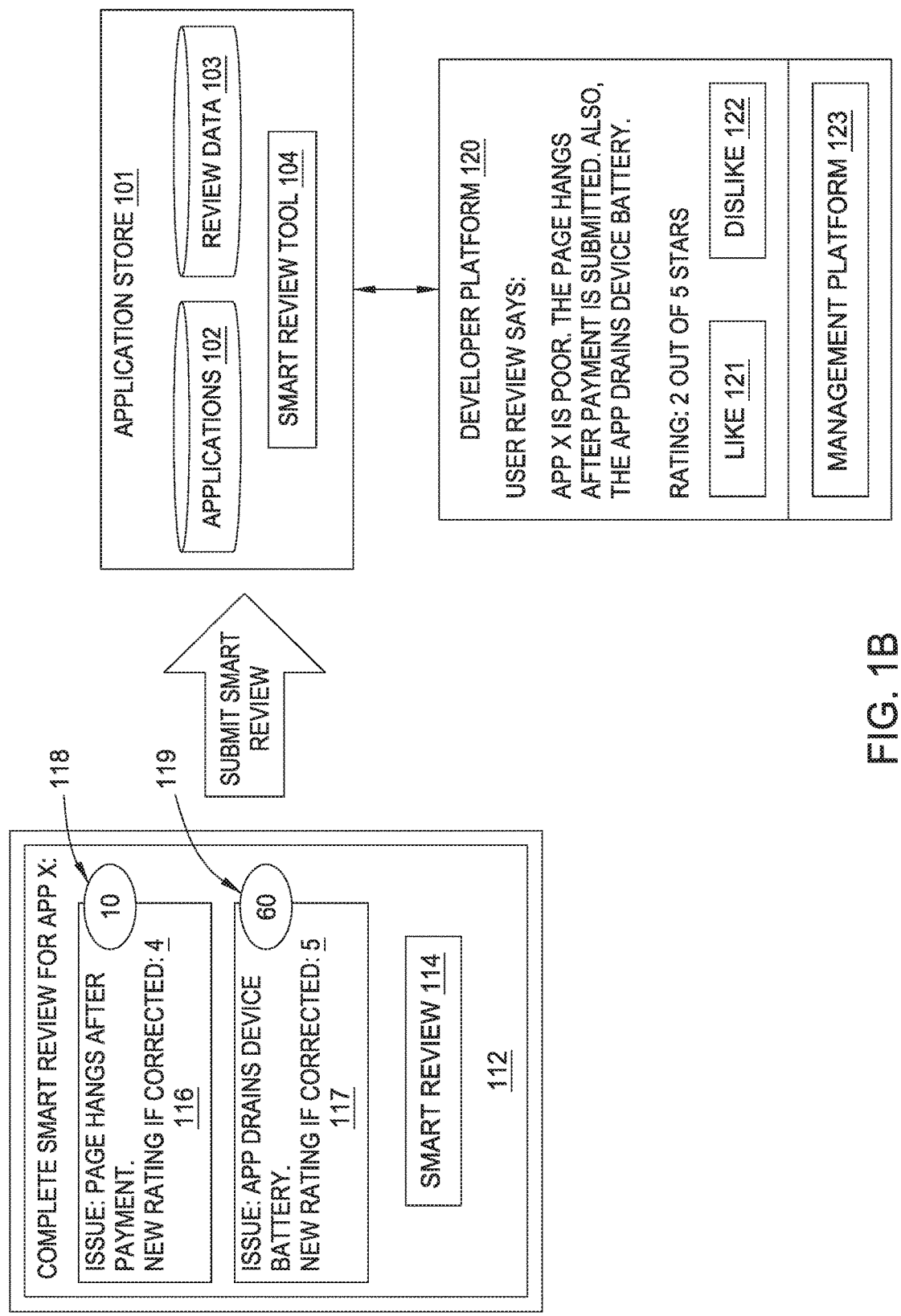

Once the user clicks the smart review button 114, the smart review tool 104 may update the GUI 112 as depicted in FIG. 1B. Specifically, the GUI 112 now provides a GUI element 116 for the user to provide a "smart" review for App X that would be applicable if the page hang performance issue is resolved, and a GUI element 117 for the user to provide a smart review for App X that would be applicable if the battery drain performance issue is resolved. As shown, the user has provided a value of 4 out of 5 stars in GUI element 116, while providing a value of 5 out of 5 stars if the "drains device battery" in GUI element 117. By providing these smart review values, the smart review tool 104 may subsequently modify the initial review provided by the user when the associated performance issues. For example, if the smart review tool 104 determines that the page hang performance issue is resolved, the smart review tool 104 would change the user's rating from 2 to 4. Similarly, if the smart review tool 104 determines that the battery drain performance issue is resolved, the smart review tool 104 would change the user's rating from 2 to 5 (or 4 to 5, if the smart review tool 104 previously adjusted the score from 2 to 4).

Furthermore, as shown, the GUI 112 includes two additional GUI elements 118, 119, which reflect a count of users that have submitted reviews (of any type) in the review data 103 that include an indication of the associated performance issue. Therefore, as shown in GUI element 118, 10 users have commented regarding the page hang performance issue of App X. Similarly, as shown in GUI element 119, 60 users have commented regarding the battery drain performance issue caused by App X. Furthermore, as shown, GUI element 119 is shaded to reflect a heightened criticality level associated with the battery drain performance issue. For example, based on the monitoring of the reviews in the review data 103, the smart review tool 104 may determine that the page hang performance issue is of a "low" criticality level, while the battery drain performance issue is of a "high" criticality level. In at least one embodiment, the criticality levels are determined based on the number of users who have mentioned the corresponding performance issue in a review and/or the overall increase in the application's rating if the smart review rating associated with the performance issue were applied.

Once the user completes the smart review via the GUI 112, the user may submit the smart review via the smart review button 114. The user's review including any text, the initial rating value (e.g., 2 out of 5 stars) and any smart review values (e.g., 4 out of 5 stars, and 5 out of 5 stars), are then stored in the review data 103 in a record associated with App X and the submitting user.

As shown, the smart review tool 104 also provides a developer platform 120 which allows representatives of an application developer to rate user reviews. As shown, the developer platform 120 outputs the text of the user review and the 2 out of 5 star rating. The developer platform 120 also includes a like button 121 and a dislike button 122, which allow the developer's representative to "like" or "dislike" the review, respectively. In at least one embodiment, the developer platform 120 only outputs reviews that were verified to include at least one known defect reflected in the review data 103. Generally, when the like button 121 and/or dislike button 122 is selected, the smart review tool 104 stores an indication of the selected button in the review data 103 as metadata for the user who wrote the review. By tracking likes and dislikes, the smart review tool 104 can determine which users who have provided the most helpful or otherwise relevant reviews. Doing so allows the smart review tool 104 to identify one or more reviewers who should be granted monetary rewards for their contributions. In at least one embodiment, the smart review tool 104 may serially output each performance issue for like/dislike at a time via the developer platform 120. For example, the "page hang" review may be outputted first, and receive a dislike from a representative of the application developer, while the "battery drain" performance issue may be outputted second, and receive a like from the representative, reflecting the relative importance of each performance issue. Therefore, the smart review tool 104 may provide rewards to reviewing users on a per-issue basis.

Once the smart review tool 104 has identified a performance issue in a threshold number of reviews in the review data 103, the smart review tool 104 continuously makes a determination as to whether the performance issue has been resolved by the application developer. For example, the developer of App X may release an update to App X, which includes release notes describing the changes made to App X. The smart review tool 104 may analyze the release notes to determine whether the battery drain and/or page hang performance issues are specified as being resolved in the update to App X. If the release notes specify that one or more known performance issues are resolved, the smart review tool 104 analyzes the review data 103 to determine whether subsequent user reviews indicate that the performance issues have been resolved. In at least one embodiment, the smart review tool 104 monitors reviews for a predetermined amount of time (e.g., 10 days, 2 weeks, etc.) before determining that the user reviews indicate that the performance issues have been resolved. Once the smart review tool 104 determines that a performance issue has been resolved, the smart review tool 104 applies the smart review ratings submitted by each user as part of their respective smart review. For example, if the smart review tool 104 determines that the page hang performance issue is resolved, the example 4 out of 5 rating depicted in FIG. 1A is applied to the corresponding user's review of App X in the review data 103, replacing the 2 out of 5 rating initially supplied by the user.

Additionally, the smart review tool 104 may provide the smart review data to different tools of the application developer platform 120. For example, a software management platform 123 may retrieve data from the smart review tool 104 and automatically create entries for the page hang and battery drain performance issues based on the smart reviews stored in the review data 103. Doing so allows the developer to create appropriate test cases which are associated with the corresponding performance issue. As the smart review tool 104 determines that performance issues are resolved, the management platform 123 can automatically remove each performance issue. Furthermore, the management platform 123 can prioritize each performance issue based on the total number of smart reviews reflecting each performance issue, and the criticality of each performance issue. Examples of software management platforms 123 include Rational Team Concert and Rational Quality Manager, each by IBM.

Figure 2:
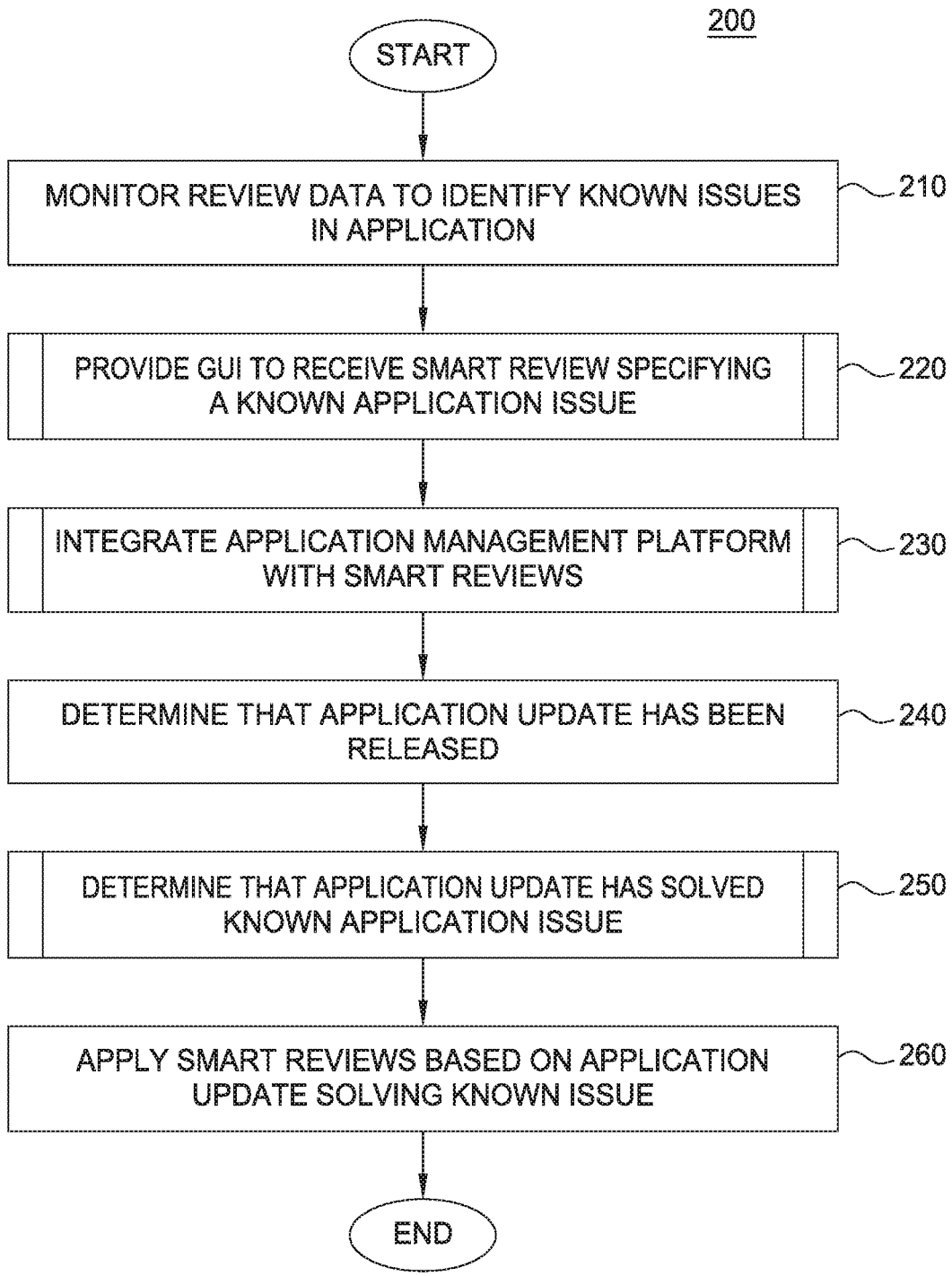
FIG. 2 is a flow chart illustrating an example method to provide smart reviews for applications in application stores, according to one embodiment.

FIG. 2 is a flow chart illustrating an example method 200 to provide smart reviews for applications in application stores, according to one embodiment. As shown, the method 200 begins at block 210, where the smart review tool 104 monitors the review data 103 to identify known performance issues in one or more applications 102 provided by the application store 101. Generally, the smart review tool 104 periodically mines the review data 103 to identify keywords and/or concepts in the text of user reviews that indicate a performance issue with an application. For example, a user may specify that "Application Y crashes when I open a document." The smart review tool 104 may then identify store an indication of the crash performance issue in the review data 103 in a record associated with Application Y. Furthermore, the smart review tool 104 may maintain a count of users and/or reviews who have commented on each application performance issue, and a criticality level of the performance issue. For example, if 30 other reviews in the review data 103 include an indication of the crash performance issue when Application Y opens a document, the smart review tool 104 may store an indication that 30 other users have commented about the crash performance issue, and that the performance issue is of a medium criticality level. Therefore, by mining the text of the reviews included in the review data 103, the smart review tool 104 is able to identify any type of performance issue associated with one or more of the applications 102.

At block 220, described in greater detail with reference to FIG. 3, the smart review tool 104 provides a GUI to receive a smart review from a user, where the smart review specifies a known application performance issue based on the performance issues in the review data 103 identified at block 210. For example, a user may provide a review for Application Y, indicating an initial review of 1 out of 5 stars, a comment indicating that the application crashes when a document is opened, and that the user would rate the application 4 out of 5 stars if the crash performance issue was fixed. At block 230, described in greater detail with reference to FIG. 4, the management platform 123 is configured to interface with the smart review tool 104, allowing the management platform 123 to receive data from the review data 103 of the application store 101. Doing so allows the management platform 123 to automatically identify and prioritize performance issues in the applications 102. For example, the management platform 123 would receive an automatic indication of the crash performance issue for Application Y.

At block 240, the smart review tool 104 determines that an update to the application 102 has been released. In at least one embodiment, the smart review tool 104 determines that an update is released by periodically analyzing metadata associated with each application 102. The metadata may a specify a version number of the latest version of the application, a release date of the latest version of the application, and release notes describing any performance issues resolved by the latest version of the application. Therefore, if the smart review tool 104 identifies a new version number or release date for a given application 102, the smart review tool 104 may determine that an update for the application 102 has been released.

At block 250, described in greater detail with reference to FIG. 5, the smart review tool 104 determines that the application update identified at block 240 has solved the known application performance issue. Generally, the smart review tool 104 analyzes the release notes associated with the latest version of the application to determine whether the identified performance issue is mentioned as being resolved. For example, the release notes may state that the latest update to Application Y has "fixed document crash issue." To ensure that the performance issue has indeed been fixed, the smart review tool 104 also monitors reviews submitted by users to the review data 103 subsequent to the application update. By analyzing the subsequent reviews, the smart review tool 104 may determine whether users continue to mention the same performance issue in their comments. For example, the smart review tool 104 may analyze reviews submitted in the month following the update to Application Y, and determine that the document crash performance issue is no longer mentioned by users (or by less than a threshold number of users). The smart review tool 104 may then determine that the performance issue has been resolved. However, if the smart review tool 104 determines that the release notes do not specify a fix for the performance issue and/or the reviews continue to mention the performance issue, the smart review tool 104 determines that the performance issue has not been resolved. At block 260, the smart review tool 104 applies the smart reviews triggered by resolution of the application performance issue. For example, if the smart review tool 104 determines that the document crash performance issue of Application Y has been resolved, the smart review tool 104 would then identify each smart review in the review data 103 that mentioned the document crash performance issue. The smart review tool 104 would then apply the smart review rating provided by each user who submitted a smart review associated with the document crash performance issue. Therefore, if 30 users provided smart reviews mentioning the document crash performance issue, the smart review tool 104 would update each of the 30 reviews to reflect the star review rating provided by each user.

Figure 3:
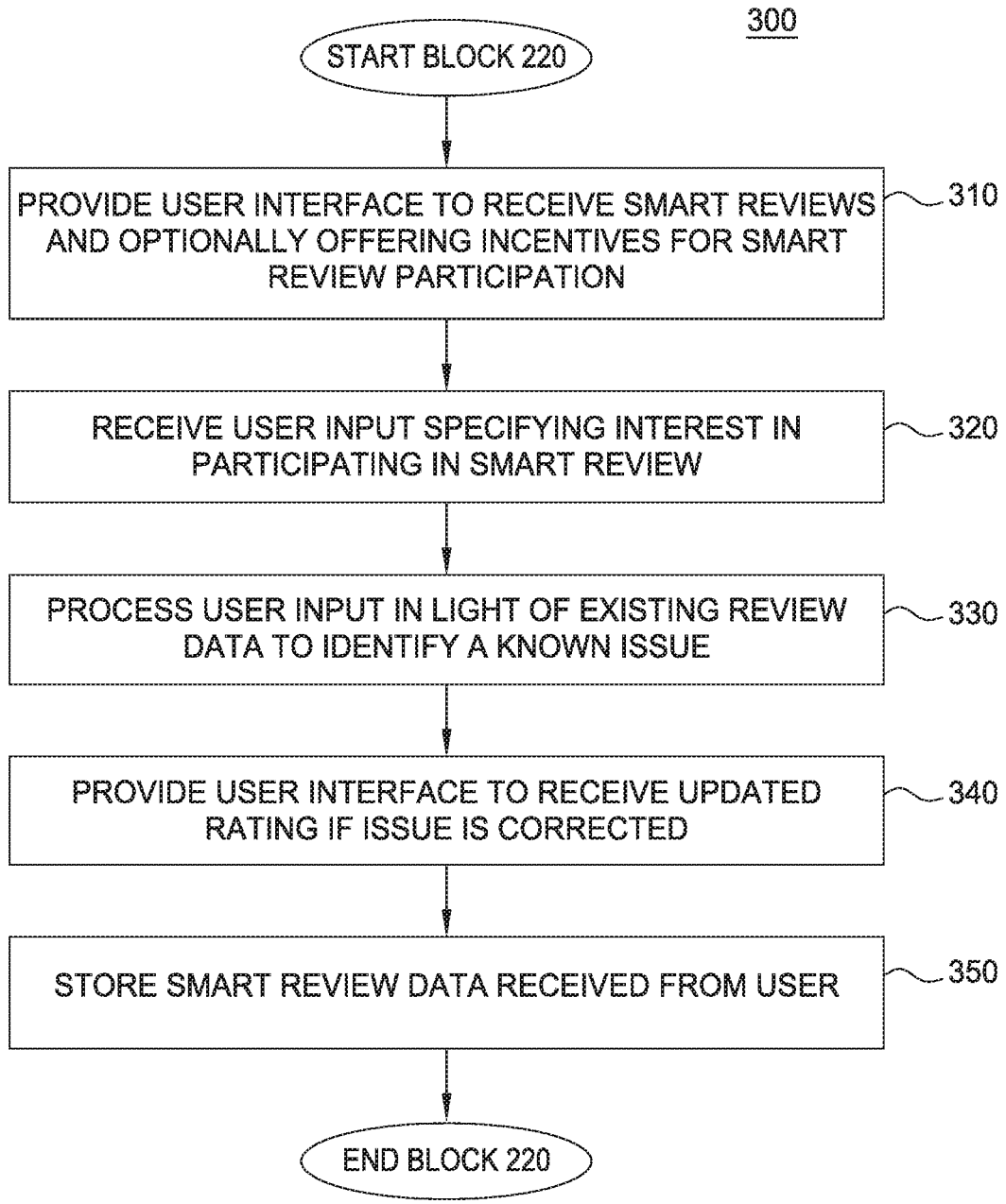
FIG. 3 is a flow chart illustrating an example method to provide a user interface to receive a smart review specifying an indication of a known application defect, according to one embodiment.

FIG. 3 is a flow chart illustrating an example method 300 corresponding to block 220 to provide a GUI to receive a smart review specifying an indication of a known application defect, according to one embodiment. As shown, the method 300 begins at block 310, where the smart review tool 104 provides a graphical user interface (e.g., the GUI 112) to receive smart reviews. The GUI may also provide incentives to the user to provide a smart review, such as credits for the application store, or monetary rewards for providing smart reviews which uncover application performance issues having high criticality levels. At block 320, the smart review tool 104 receives user input via the GUI 112 specifying interest in participating in the smart review program. In at least one embodiment, the input includes a text-based review of a corresponding application 102. For example, the user may specify the document crash performance issue of Application Y.

At block 330, the smart review tool 104 processes the user input in light of the known performance issues stored in the review data 103. Generally, the smart review tool 104 performs a semantic comparison between the terms of the text of the review and the text descriptions of the known performance issues in the review data 103. Therefore, if the user mentions the document crash performance issue of Application Y, the smart review tool 104 can match the concepts in the user review to the concepts associated with the known document crash performance issue in the review data 103. At block 340, the smart review tool 104 provides the GUI 112 to receive the updated rating which will be invoked if the known performance issue is corrected. For example, in block 320, the user may provide a rating for 3 out of 5 stars for Application Y. However, at block 340, the user may provide a smart rating of 5 out of 5 stars if the document crash performance issue of Application Y is resolved. In participating in the smart review program, the user agrees that the rating provided at block 320 will be changed to the smart rating provided at block 340 if the performance issue is resolved. At block 350, the smart review tool 104 stores the smart review data received from the user, which includes an initial rating (e.g., 3 out of 5 stars), the smart rating (e.g., 5 out of 5 stars), and the text of the review provided by the user.

Figure 4:
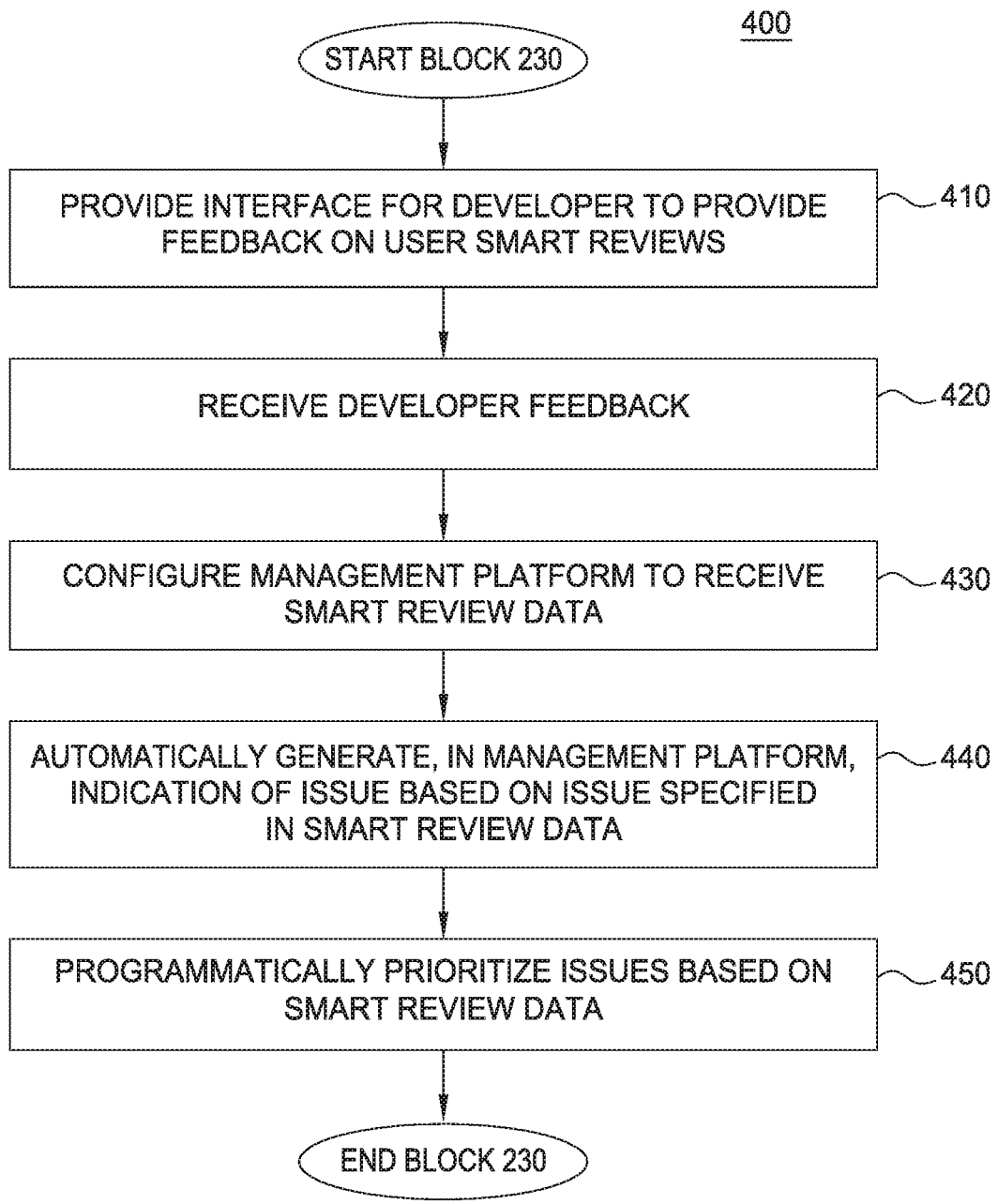
FIG. 4 is a flow chart illustrating an example method to integrate smart reviews with application development lifecycle tools, according to one embodiment.

FIG. 4 is a flow chart illustrating an example method 400 corresponding to block 230 to integrate smart reviews with application management platforms, according to one embodiment. As shown, the method 400 begins at block 410, where an interface such as the interface 120 of FIG. 1B is provided to receive developer feedback for user smart reviews. Doing so allows the developer to provide an indication to the smart review tool 104 of which users are submitting important or unimportant reviews. At block 420, the smart review tool 104 receives the developer feedback for each of a plurality of different reviews of the developer's application(s). Over time, the smart review tool 104 may use the developer feedback to provide rewards to users, and limit the rewards to only those users who provide valid reviews. Therefore, a user who attempts to provide false or otherwise unimportant reviews would not be rewarded by the smart review tool 104.

At block 430, the management platform 123 is configured to receive smart review data from the smart review tool 104. For example, when the smart review tool 104 determines that a threshold number of reviews have mentioned the document crash performance issue of Application Y (and/or the document crash performance issue receives a threshold criticality level), the smart review tool 104 would send an indication of the document crash performance issue to the management platform 123 of the developer of Application Y. At block 440, the management platform 123 generates an indication of an application performance issue based on the information received from the smart review tool 104. For example, the management platform 123 used by the developer of Application Y would automatically create an action item associated with the document crash performance issue of Application Y. Doing so allows the development team to immediately identify the crash performance issue and begin working on a fix. At block 450, the management platform 123 prioritizes the application performance issues based on the data received from the smart review tool 104. For example, the management platform 123 may order performance issues based on the associated criticality of each performance issue, allowing the development team to prioritize fixes based on criticality of each performance issue.

Figure 5:
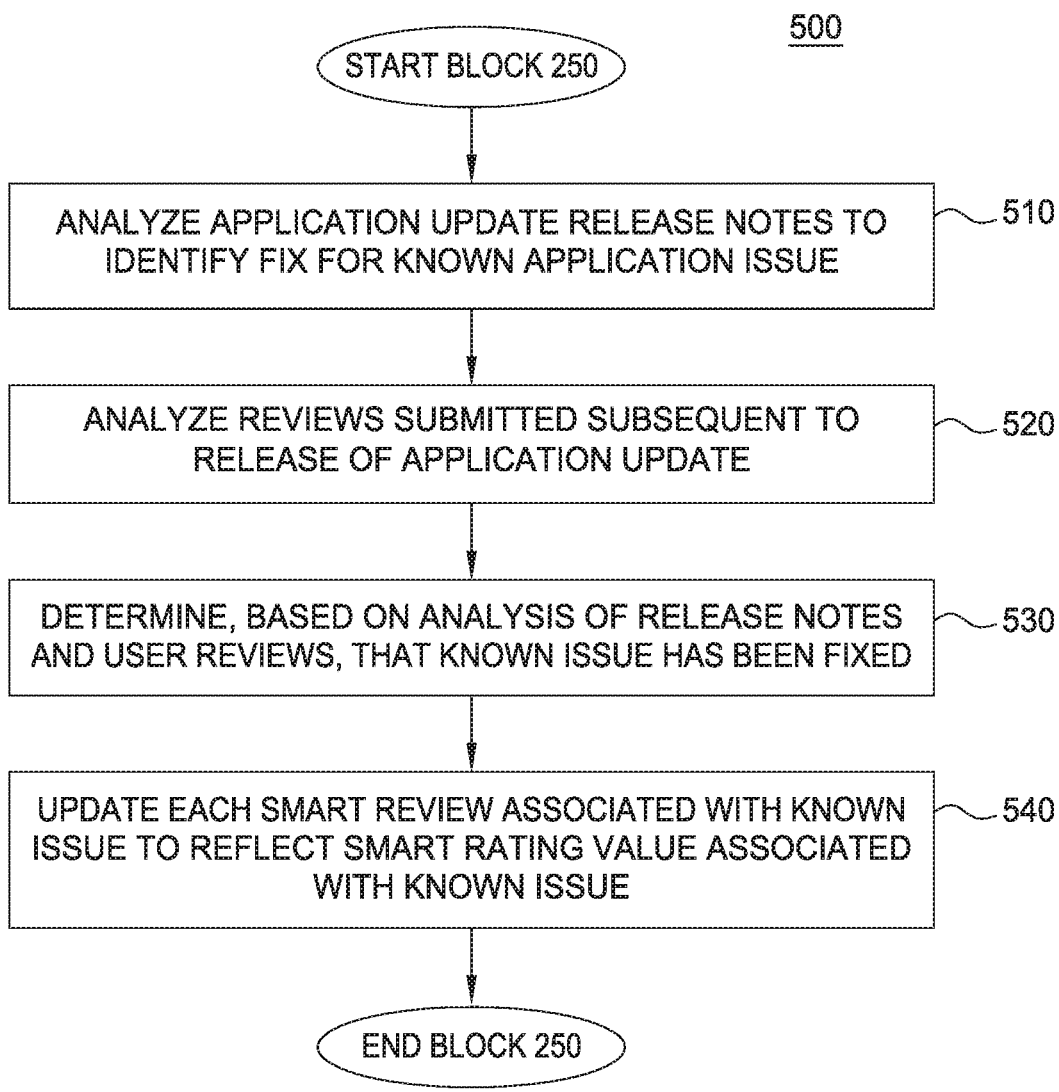
FIG. 5 is a flow chart illustrating an example method to determine that an application update has solved a known defect, according to one embodiment.

FIG. 5 is a flow chart illustrating an example method 500 corresponding to block 250 to determine that an application update has solved a known defect, according to one embodiment. As shown, the method 500 begins at block 510, where the smart review tool 104 analyzes the update release notes included with an application update to identify that a fix has been included for one or more known application performance issues. Generally, the smart review tool 104 performs a semantic comparison between the text of the release notes and the text of the known performance issues stored in the review data 103 to determine whether a performance issue is fixed. At block 520, the smart review tool 104 analyzes the reviews submitted by users subsequent to the release of the application update. Generally, in analyzing the subsequent reviews, the smart review tool 104 determines whether users continue to mention the known performance issues. For example, if users continue to include an indication of the document crash performance issue for a month after an update to Application Y purporting to fix the document crash performance issue is released, the smart review tool 104 will determine that the document crash performance issue has not been fixed. However, if the reviews do not mention the known performance issue (or fewer than a threshold number of reviews mention the known performance issue) at block 530, the smart review tool 104 determines that the known performance issue has been fixed. However, if the reviews and/or release notes do not indicate that the known performance issue has been fixed, the smart review tool 104 would not determine that the performance issue has been fixed. However, once the smart review tool 104 determines that the known performance issue has been fixed, at block 540 the smart review tool 104 updates the review data 103 using smart rating values provided by the users who provided a smart rating value associated with the known performance issue that has been fixed. Therefore, the smart review tool 104 automatically changes the initial review values provided by users to the smart rating values provided by the users on the condition that the known performance issues are fixed.

Figure 6:
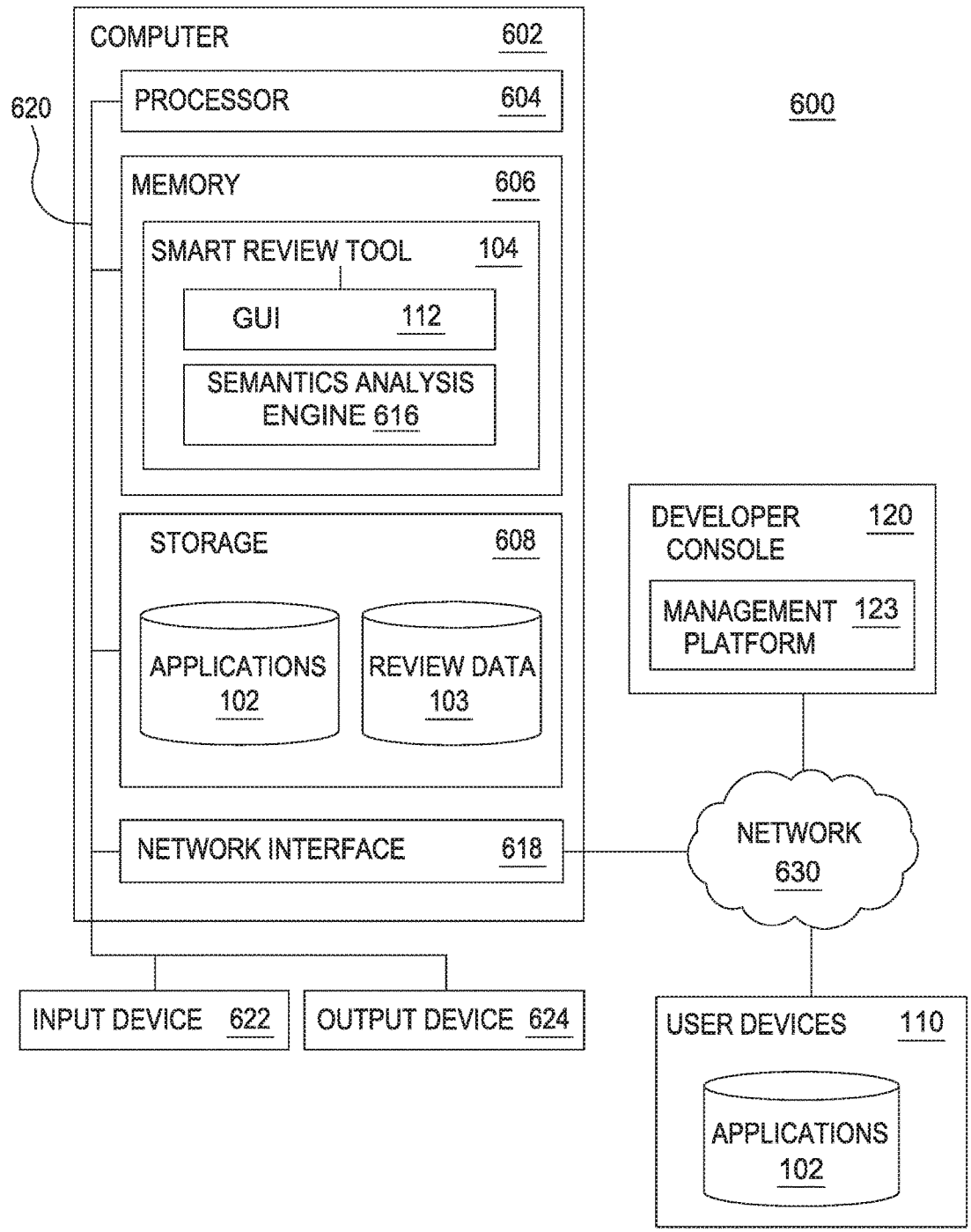
FIG. 6 illustrates an example system which provides smart reviews for applications in application stores, according to one embodiment.

FIG. 6 illustrates an example system 600 which provides smart reviews for applications in application stores, according to one embodiment. The networked system 600 includes a computer 602. The computer 602 may also be connected to other computers via a network 630. In general, the network 630 may be a telecommunications network and/or a wide area network (WAN). In a particular embodiment, the network 630 is the Internet.

The computer 602 generally includes a processor 604 which obtains instructions and data via a bus 620 from a memory 606 and/or a storage 608. The computer 602 may also include one or more network interface devices 618, input devices 622, and output devices 624 connected to the bus 620. The computer 602 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the computer 602 to communicate with other computers via the network 630.

The storage 608 is representative of hard-disk drives, solid state drives, flash memory devices, optical media and the like. Generally, the storage 608 stores application programs and data for use by the computer 602. In addition, the memory 606 and the storage 608 may be considered to include memory physically located elsewhere; for example, on another computer coupled to the computer 602 via the bus 620.

The input device 622 may be any device for providing input to the computer 602. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the computer 602. The output device 624 may include output devices such as monitors, touch screen displays, and so on.

As shown, the memory 606 contains the smart review tool 104, which includes the GUI 112, and a semantics analysis engine 616. The semantics analysis engine 616 is generally configured to perform a semantic analysis of text using one or more text analysis algorithms. For example, the semantics analysis engine 616 may analyze the textual reviews submitted via the GUI 112 (and/or stored in the review data 103) to identify concepts in the textual reviews. The semantics analysis engine 616 may also match concepts between different blocks of text, (e.g., the text reviews composed via the GUI 112 and text reviews stored in the review data 103). For example, the semantics analysis engine 616 may identify the "battery drain performance issue" in a text portion of a review for Application Z submitted via the GUI 112. The semantics analysis engine 616 may then analyze the textual reviews stored in the review data 103 to determine which (and how many) reviews mention the battery drain performance issue of Application Z. The semantics analysis engine 616 may subsequently analyze the release notes for an update to Application Z to determine that the battery drain performance issue has been resolved by an update. The semantics analysis engine 616 may then analyze reviews for Application Z in the review data 103 subsequent to the release of the update to determine whether the battery drain performance issue has been fixed, as described in greater detail above.

As shown, the storage 608 contains the applications 102 and the review data 103. As shown, the computer 602 is communicably coupled with the developer console 120, which includes the management platform 123, and the user devices 110, which include the applications 102. Generally, the system 600 is configured to implement all functionality described with reference to FIGS. 1-5.

Advantageously, embodiments disclosed herein provide techniques to programmatically manage user reviews. By providing smart reviews, users can provide conditional rating values for known application performance issues, which are automatically updated when the smart review tool 104 determines that the application performance issues are resolved. Doing so ensures that reviews in the review data 103 accurately reflect the current state of a given application 102 without users having to manually edit their reviews after each application update.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the smart review tool 104 could execute on a computing system in the cloud. In such a case, the smart review tool 104 may store review data 103 received from a plurality of users at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving, at a first point in time, a first review from a first user, wherein the first review specifies an initial rating value, a conditional rating value, and a textual review for an application in an application store, wherein the initial rating value is for a current version of the application, and the conditional rating value is for a hypothetical future version of the application;
   associating the application with the textual review and the initial rating value;
   modifying an overall rating of the application based on the initial rating value;
   analyzing, via a semantics analysis engine, the textual review to determine that the textual review specifies a first known performance issue for the application, wherein the conditional rating value is contingent on the first known performance issue being resolved;
   determining, at a second point in time subsequent to the first point in time, based on (i) an update to the application and (ii) reviews for the application received subsequent to the update to the application, that the first known performance issue has been resolved; and
   upon determining that the first known performance issue has been resolved, automatically:
      removing the association between the application and the initial rating value;
      associating the application with the conditional rating value without additional input from the first user; and
      modifying the overall rating of the application based on the conditional rating value.

2. The method of claim 1, wherein determining that the first known performance issue has been resolved comprises:
   identifying an indication that the first known performance issue has been resolved in a release notes associated with the update to the application;
   analyzing, by the semantics analysis engine, a respective text of the reviews received subsequent to the update to the application for a predetermined amount of time; and
   determining, based on the analysis of the semantics analysis engine, that a count of the reviews received subsequent to the update to the application that specify the first known performance issue is less than a predefined threshold.

3. The method of claim 1, wherein analyzing the textual review comprises:
   identifying, by the semantics analysis engine, a concept in the textual review;
   performing, by the semantics analysis engine, a semantic comparison between the concept and a plurality of existing reviews specifying an indication of the first known performance issue; and
   determining, based on the analysis of the semantics analysis engine, that a count of the plurality of existing reviews exceeds a predefined threshold.

4. The method of claim 1, further comprising:
   receiving, by a developer management console, an indication of the first known performance issue for the application; and
   creating, by the developer management console, an entry corresponding to the first known performance issue.

5. The method of claim 1, further comprising:
   analyzing, by the semantics analysis engine, a textual review associated with each of a plurality of reviews associated with the application in the application store;
   determining, based on the analysis of the semantics analysis engine, that a subset of the plurality of reviews includes an indication of the first known performance issue;
   storing an indication of the first known performance issue, wherein the indication comprises a count of the subset of the plurality of reviews and a criticality level associated with the first known performance issue; and
   determining a criticality level for the first known performance issue, based at least in part on a difference between the conditional rating value and the initial rating value.

6. The method of claim 1, further comprising:
   determining at least one of: (i) that the update to the application did not address the first known performance issue, and (ii) a count of the reviews for the application received subsequent to the update to the application that include an indication of the first known performance issue exceed a specified threshold;
   determining that the update to the application has not resolved the first known performance issue; and
   refraining from associating the first review in the application store with the conditional rating value, wherein the first review remains associated with the initial rating value.

7. The method of claim 1, further comprising subsequent to determining that the update to the application has resolved the first known performance issue:
   identifying, by the semantics analysis engine, a plurality of other reviews determined to have specified an indication of the first known performance issue; and
   associating each of the plurality of other reviews with a respective smart rating value associated with the first known performance issue.

8. A computer program product, comprising:
   a computer-readable storage medium having computer readable program code embodied therewith, the computer readable program code executable by a processor to perform an operation comprising:
      receiving, at a first point in time, a first review from a first user, wherein the first review specifies an initial rating value, a conditional rating value, and a textual review for an application in an application store, wherein the initial rating value is for a current version of the application, and the conditional rating value is for a hypothetical future version of the application;
      associating the application with the textual review and the initial rating value;
      modifying an overall rating of the application based on the initial rating value;
      analyzing, via a semantics analysis engine, the textual review to determine that the textual review specifies a first known performance issue for the application, wherein the conditional rating value is contingent on the first known performance issue being resolved; based on (i) an update to the application and (ii) reviews for the application received subsequent to the update to the application, that the first known performance issue has been resolved; and upon determining that the first known performance issue has been resolved, automatically:

removing the association between the application and the initial rating value;

associating the application with the conditional rating value without additional input from the first user; and modifying the overall rating of the application based on the conditional rating value.

9. The computer program product of claim 8, wherein determining that the first known performance issue has been resolved comprises:

identifying an indication that the first known performance issue has been resolved in a release notes associated with the update to the application;

analyzing, by the semantics analysis engine, a respective text of the reviews received subsequent to the update to the application for a predetermined amount of time; and determining, based on the analysis of the semantics analysis engine, that a count of the reviews received subsequent to the update to the application that specify the first known performance issue is less than a predefined threshold.

10. The computer program product of claim 8, wherein invoking the semantics analysis engine to determine that the textual review specifies the first known performance issue for the application comprises:

identifying, by the semantics analysis engine, a concept in the textual review;

performing, by the semantics analysis engine, a semantic comparison between the concept and a plurality of existing reviews specifying an indication of the first known performance issue; and determining, based on the analysis of the semantics analysis engine, that a count of the plurality of existing reviews exceeds a predefined threshold.

11. The computer program product of claim 8, the operation further comprising:

receiving, by a developer management console, an indication of the first known performance issue for the application; and creating, by the developer management console, an entry corresponding to the first known performance issue.

12. The computer program product of claim 8, the operation further comprising:

analyzing, by the semantics analysis engine, a textual review associated with each of a plurality of reviews associated with the application in the application store;

determining, based on the analysis of the semantics analysis engine, that a subset of the plurality of reviews includes an indication of the first known performance issue;

storing an indication of the first known performance issue, wherein the indication comprises a count of the subset of the plurality of reviews and a criticality level associated with the first known performance issue; and determining a criticality level for the first known performance issue, based at least in part on a difference between the conditional rating value and the initial rating value.

13. The computer program product of claim 8, the operation further comprising:

determining at least one of: (i) that the update to the application did not address the first known performance issue, and (ii) a count of the reviews for the application received subsequent to the update to the application that include an indication of the first known performance issue exceed a specified threshold;

determining that the update to the application has not resolved the first known performance issue; and refraining from associating the first review in the application store with the second rating value, wherein the first review remains associated with the first rating value.

14. The computer program product of claim 8, the operation further comprising subsequent to determining that the update to the application has resolved the first known performance issue:

identifying, by the semantics analysis engine, a plurality of other reviews determined to have specified an indication of the first known performance issue; and associating each of the plurality of other reviews with a respective smart rating value associated with the first known performance issue.

15. A system, comprising:

a processor; and a memory storing one or more instructions which, when executed by the processor, performs an operation comprising:

receiving, at a first point in time, a first review from a first user, wherein the first review specifies an initial rating value, a conditional rating value, and a textual review for an application in an application store, wherein the initial rating value is for a current version of the application, and the conditional rating value is for a hypothetical future version of the application;

associating the application with the textual review and the initial rating value;

modifying an overall rating of the application based on the initial rating value;

analyzing, via a semantics analysis engine, the textual review to determine that the textual review specifies a first known performance issue for the application, wherein the conditional rating value is contingent on the first known performance issue being resolved;

determining, at a second point in time subsequent to the first point in time, based on (i) an update to the application and (ii) reviews for the application received subsequent to the update to the application, that the first known performance issue has been resolved; and upon determining that the first known performance issue has been resolved, automatically:

removing the association between the application and the initial rating value;

associating the application with the conditional rating value without additional input from the first user; and modifying the overall rating of the application based on the conditional rating value.

16. The system of claim 15, wherein determining that the first known performance issue has been resolved comprises:

identifying an indication that the first known performance issue has been resolved in a release notes associated with the update to the application;

analyzing, by the semantics analysis engine, a respective text of the reviews received subsequent to the update to the application for a predetermined amount of time; and determining, based on the analysis of the semantics analysis engine, that a count of the reviews received subsequent to the update to the application that specify the first known performance issue is less than a predefined threshold.

17. The system of claim 15, wherein invoking the semantics analysis engine to determine that the textual review specifies the first known performance issue for the application comprises:
   identifying, by the semantics analysis engine, a concept in the textual review;
   performing, by the semantics analysis engine, a semantic comparison between the concept and a plurality of existing reviews specifying an indication of the first known performance issue; and
   determining, based on the analysis of the semantics analysis engine, that a count of the plurality of existing reviews exceeds a predefined threshold.

18. The system of claim 15, the operation further comprising:
   receiving, by a developer management console, an indication of the first known performance issue for the application; and
   creating, by the developer management console, an entry corresponding to the first known performance issue.

19. The system of claim 15, the operation further comprising:
   analyzing, by the semantics analysis engine, a textual review associated with each of a plurality of reviews associated with the application in the application store;
   determining, based on the analysis of the semantics analysis engine, that a subset of the plurality of reviews includes an indication of the first known performance issue;
   storing an indication of the first known performance issue, wherein the indication comprises a count of the subset of the plurality of reviews and a criticality level associated with the first known performance issue; and
   determining a criticality level for the first known performance issue, based at least in part on a difference between the conditional rating value and the initial rating value.

20. The system of claim 15, the operation further comprising:
   determining at least one of: (i) that the update to the application did not address the first known performance issue, and (ii) a count of the reviews for the application received subsequent to the update to the application that include an indication of the first known performance issue exceed a specified threshold;
   determining that the update to the application has not resolved the first known performance issue; and
   refraining from associating the first review in the application store with the second rating value, wherein the first review remains associated with the first rating value.

* * * * *